US006672986B2

(12) United States Patent
Zhou

(10) Patent No.: US 6,672,986 B2
(45) Date of Patent: Jan. 6, 2004

(54) NORMALLY INTERLOCKED UNIVERSAL DIFFERENTIAL DEVICE

(76) Inventor: Dianxi Zhou, 3/FL. Shixi gongchang Hubei qiche gongye xueyuan, Shiyan City, Hubei Province, P.R. (CN), 442002

( * ) Notice: Subject to any disclaimer, the term of this patent is extended or adjusted under 35 U.S.C. 154(b) by 12 days.

(21) Appl. No.: 10/184,319

(22) Filed: Jun. 27, 2002

(65) Prior Publication Data

US 2003/0013573 A1 Jan. 16, 2003

(30) Foreign Application Priority Data

Jul. 13, 2001 (CN) ......................................... 01114361 A

(51) Int. Cl.[7] ............................................... F16H 48/06
(52) U.S. Cl. ........................ 475/221; 475/225; 475/242; 180/248
(58) Field of Search ............................... 475/221, 222, 475/225, 242; 180/248, 249

(56) References Cited

U.S. PATENT DOCUMENTS

| | | | | |
|---|---|---|---|---|
| 1,403,994 A | * | 1/1922 | Wegmann | 475/221 |
| 1,464,777 A | * | 8/1923 | Ross | 475/221 |
| 1,686,431 A | * | 10/1928 | Robinson | 475/221 |
| 1,828,073 A | * | 10/1931 | Wyman | 475/221 |
| 2,102,313 A | * | 12/1937 | Fraser | 475/221 |
| 4,645,029 A | * | 2/1987 | Sasaki et al. | 475/221 |
| 4,819,512 A | * | 4/1989 | Azuma et al. | 475/221 |
| 5,042,610 A | | 8/1991 | Shiraishi et al. | 180/249 |
| 5,910,060 A | * | 6/1999 | Blume | 475/221 |
| 6,120,407 A | * | 9/2000 | Mimura | 475/221 |

* cited by examiner

Primary Examiner—Charles A Marmor
Assistant Examiner—Dennis Abdelnour
(74) Attorney, Agent, or Firm—Westman, Champlin & Kelly, P.A.

(57) ABSTRACT

A normally interlocked universal differential device comprises four differentials and two power distributors, in which a central composite differential is disposed in the central portion thereof, and includes an outer differential and an inner differential fitted into said outer differential, two side differentials are connected to both side ends of said central composite differential, power is transmitted to said power distributors from both ends of said two side differentials. The differential device can prevent a vehicle from slipping in the desert zone or the marsh land. The differential device is easy to assemble and has small size, thus increasing the steering ability, and it can be applied to the all-wheel drive automobile, the tractor, the wheeled engineering machinery and the wheeled engineering vehicle.

6 Claims, 4 Drawing Sheets

NORMALLY INTERLOCKED UNIVERSAL DIFFERENTIAL DEVICE

This application claims priority of Chinese Application Number 01114361.4, filed Jul. 13, 2001.

BACKGROUND OF THE INVENTION

1. Technical Field

The present invention relates to a normally interlocked universal differential device.

2. Description of the Prior Art

Until now, a vehicle generally performs its power transmission by using a differential mounted on the front axle or the rear axle thereof, and such vehicle can not run normally on the muddy roads due to slipping. Accordingly, the multiple-axle dive is used for overcoming the slipping. However, it may only avoid the slipping occurring in a two-wheel drive vehicle, while a vehicle can not run normally when the wheels at one side or on a diagonal line thereof slip due to insufficient road holding force. To this end, there have been provided various differentials to overcome the slipping of the wheels. However, they have a common problem that if the differential is locked, even if the vehicle can exert sufficient tractive force, but can not make a turn; if the vehicle can make a turn, it can not exert sufficient tractive force on the muddy roads, and even can not run normally.

In order to resolve the slipping of wheels, the Chinese Patent No. ZL98100725.2 disclosed a solution, which can prevent the wheels from slipping when a vehicle runs on the muddy roads. However, while the vehicle runs on the flat roads at a high speed, only front drive or rear drive can be used. The Chinese Utility Model No. ZL99208786.4 disclosed a normally interlocked universal differential device, which resolves the problems occurring in the differential operation between wheels or axles, and in the interlocking of the differential, but there is a slipping controller in its central portion, consequently, the structure is complicated and the size is big.

SUMMARY OF THE INVENTION

An object of the present invention is to resolve the above problems in the conventional differentials.

Accordingly, there is provided a normally interlocked universal differential device with simple structure, advantageous performance and small size, and also being easy to assemble.

The normally interlocked universal differential device according to the present invention comprises a central composite differential disposed in the central portion thereof and including an outer differential and an inner differential, said inner differential being fitted into the outer differential and using one pin in common to the outer differential; two side differentials connected in series to both side ends of the central composite differential respectively, each of them having a solid axle shaft, a solid axle shaft gear mounted on the solid axle shaft, a hollow axle shaft and a hollow axle shaft gear mounted on the hollow axle shaft, said two solid axle shafts passing through the corresponding hollow axle shafts and the hollow axle shaft gears at one end thereof so that the two solid axle shafts are fitted into the two hollow axle shafts and led out from the outside ends of the two side differentials respectively, and said two solid axle shafts being connected to each other at the other end thereof via the two axle shaft gears of the inner central differential, the two hollow axle shafts of said two side differentials being coupled to the wheels located on one diagonal line, and the two solid axle shafts thereof being coupled to the wheels located on another diagonal line respectively, a planetary gear of the outer central differential being meshed with ring gears provided on the cases of said two side differentials; and two power distributors having power distributing diving gears and power distributing driven gears meshed with each other respectively, said two side differentials connected in series to both side ends of the central composite differential being coupled with wheels of the vehicle via the two power distributors respectively.

The normally interlocked universal differential device according to the present invention employs a central composite differential including an outer central differential and an inner central differential fitted into the outer central differential, the central composite differential being connected in series to the two side differentials at both side ends thereof, and then connected to the two power distributors, respectively. The four output axle shafts restrict their independence each other during operation. Accordingly, regardless losing driving force to any one of the wheels, the four output axle shafts can form new differentials jointly and arbitrarily by combining the four differentials according to the requirements of driving the wheels, thus carrying out the differential operations between the wheels, the axles or the diagonal wheels. Therefore, the vehicle can run normally and make a turn safely in spite of the conditions of the road. In addition, when the vehicle run on the expressway at a high speed, four wheels thereof differentiate simultaneously and arbitrarily, circulating in power-free state, without parasitic power and influence due to the different wheel diameters. Therefore, the structure thereof is simplified greatly and the advantageous performance is ensured. Moreover, the size is reduced and assembling becomes very easy.

BRIEF DESCRIPTION OF DRAWINGS

Exemplary embodiments of the present invention will be described with reference to the drawings, in which.

DETAIL DESCRIPTION OF THE PREFERED EMBODIMENS

Figure 1:
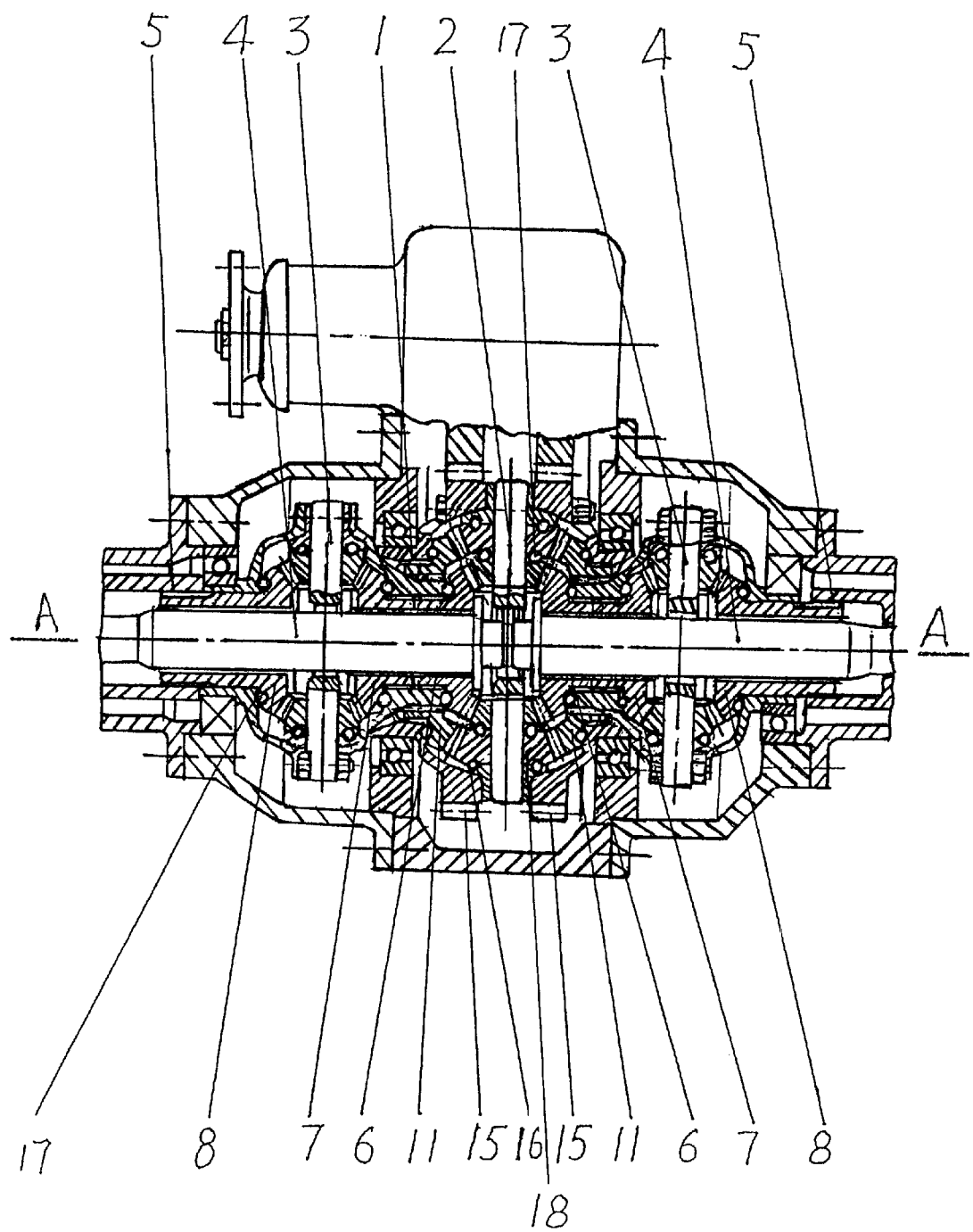
FIG. 1 is sectional view of a normally interlocked universal differential device according to the present invention.

As shown in the Figs, a normally interlocked universal differential device according to the present invention comprises four differentials and two power distributors, in which the two power distributors have power distributing driving gears 9 and power distributing driven gears 10 respectively. The four differentials include a central composite differential 1 and two side differentials 3, the central composite differential 1 is disposed in the central portion of the differential device and includes an outer differential and an inner differential fitted into the inner differential and using one pin 2 in common thereto. The two side differentials 3 are connected in series to both side ends of the central composite differential 1 respectively. Each of the two side differentials 3 has a solid axle shaft 4 coupled with a solid axle shaft gear 7, and a hollow axle shaft 5 coupled with a hollow axle shaft gear 8. The solid axle shaft 4 passes through in turn the corresponding hollow axle shaft gear 8 and the hollow axle shaft 5, being led out from the outside end of the hollow axle shaft 5, and then being coupled to the wheel via the power distributing driving gear 9 and power distributing driven gear 10. The two hollow axle shafts 5 are coupled to the wheels on one diagonal line, and the two solid axle shafts 4 are coupled to the wheels on another diagonal line. In the case illustrated in FIG. 4, the driving direction of the solid axle shafts 4 must be changed in a reducer at the side of the wheel. The two solid axle shafts 4 are connected at one end thereof via the two axle shaft gears 6 of the inner central differential. The two axle shaft gears 6 of the inner central differential are integrated with the two solid axle shaft gears 7 by the two solid axle shafts 4 passing through them, respectively. The planetary gear 18 of the outer central differential is meshed with two ring gears 11 provided on the cases of the two side differentials 3 respectively. The two ring gears 11 are either formed directly on the cases of the two side differentials 3, or fixedly mounted onto the cases after being made. The driven gears 15 of the main reducer are fixedly mounted on the case 16 of the central composite differential 1 so as to rotate the central composite differential 1 and the two side differentials 3 simultaneously. Between the inner differential and the outer differential of the central composite differential 1 are provided with friction balls 17 or the like for supporting therein. Between the outer differential and the case thereof, and between the side differentials 3 and the cases thereof are also provided with the friction balls 17 respectively.

If the two wheels on the same side of a vehicle, or the two wheels on a diagonal line slip simultaneously, the two side differentials 3 and the inner central differential connected thereto can form new differentials, so that the other two wheels which do not slip differentiate therebetween, and the vehicle can run normally. In the normally interlocked universal differential device according to the present invention, since the two solid axle shafts 4 of the two side differentials 3 are connected via the inner central differential, the planetary gears of the two side differentials 3 are meshed with the hollow axle shaft gear of the inner central differential, and the planetary gear of the outer central differential is meshed with the ring gears 11 provided on the cases of the two side differentials 3, when the vehicle differentiates normally, it carries out the differential operation between wheels, or axles, and is interlocked. When the vehicle runs on the bumpy roads, in the event that the front right wheel is hung in the air, i.e. it does not contact the ground, the front left wheel driven by the solid axle shaft does not rotate, the front axle shaft gear of the inner central differential, which is coupled to the solid axle shaft, does not rotate, While the rear axle shaft gear of the inner central differential and the solid axle shaft gear associated therewith rotate so as to drive the rear solid axle shaft to rotate the rear right wheel. The rear right wheel coupled to the rear solid axle shaft and the front right wheel are on the same side of the vehicle. Accordingly, on one side of the vehicle, there is at least one wheel that contacts the ground, thus the vehicle can run normally. Therefore, as long as the wheels on a diagonal line contact the ground, the vehicle can run normally. When a vehicle makes a turn, the differential operation between the front wheel axle and the rear wheel axle is carried out by the outer central differential and the inner central differential differentiating synchronistically the two side differentials connected in series thereto. The differential operations between the front and the rear wheels and between the right and the left wheels are carried out jointly by the inner central differential and the two side differentials connected in series thereto.

The power is output by the hollow axle shaft gears via the hollow axle shafts and the engagements of the power distributing driving gears with the power distributing driven gears. The two axle shaft gears of the inner central differential are integrated with the adjacent respective axle shaft gears by the solid axle shafts passing through them, respectively, and transmit the torque to the wheels on a diagonal line via the engagements of the power distributing driving gears with the power distributing driven gears, or the torque is transmitted directly to the wheels on a diagonal line by the solid axle shafts.

The sequence of carrying out the differential operation between the wheel axles is that: the pin of the central differential→the planetary gear of the outer central differential→the ring gears provided on the cases of the two side differentials→the inner central differential.

The sequence of carrying out the differential operation between the wheels, or between the diagonal wheels is that: the pin of the central differential→the planetary gear of the inner central differential→the two axle shaft gears of the inner central differential→the planetary gears of the two side differentials→the two hollow axle shaft gears→the two hollow axle shafts→the two solid axle shaft gears and the two solid axle shafts.

Figure 2:
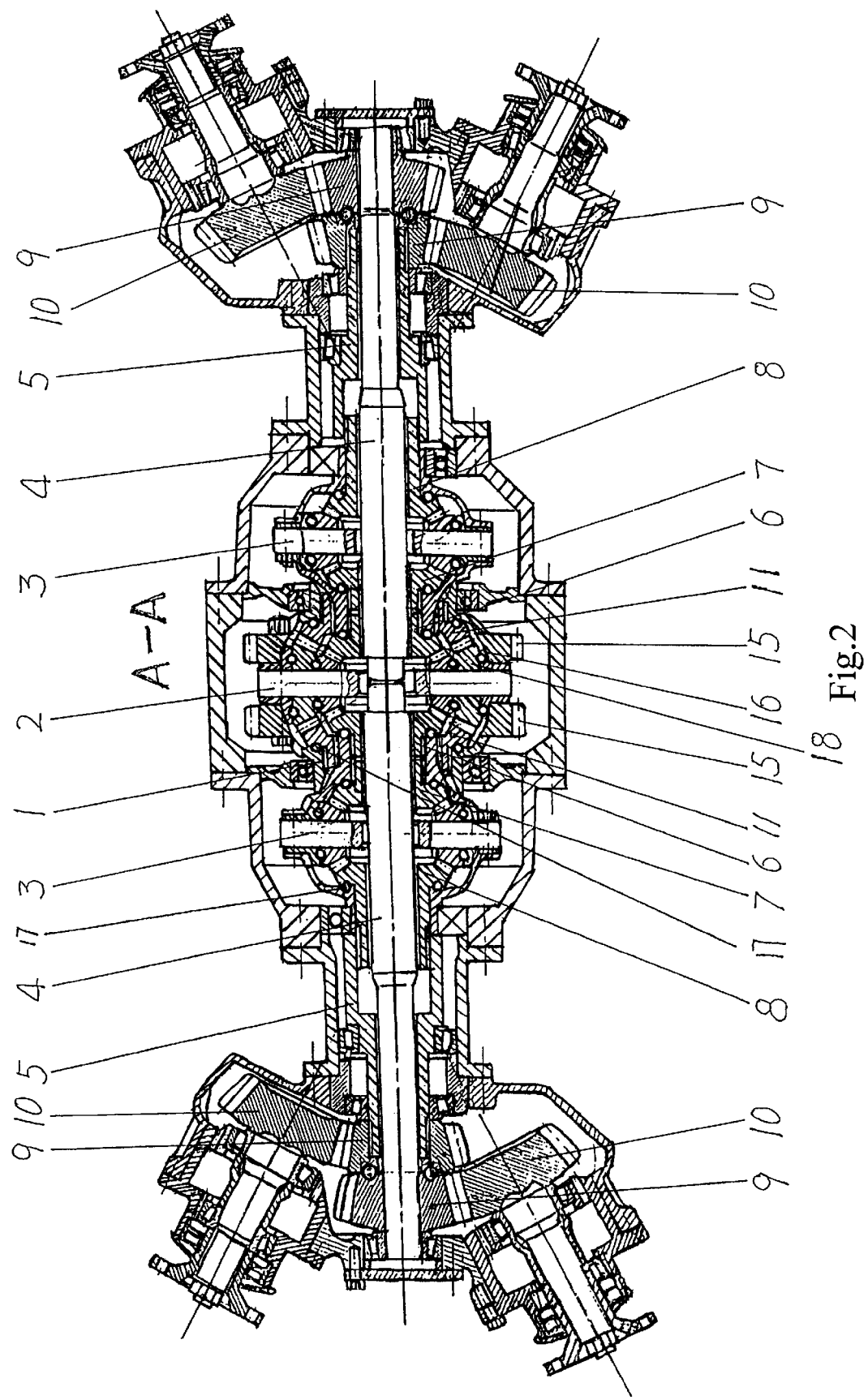
FIG. 2 is a sectional view taken along line A—A in FIG. 1, showing the torque output of the first embodiment of the present invention.
Figure 4:
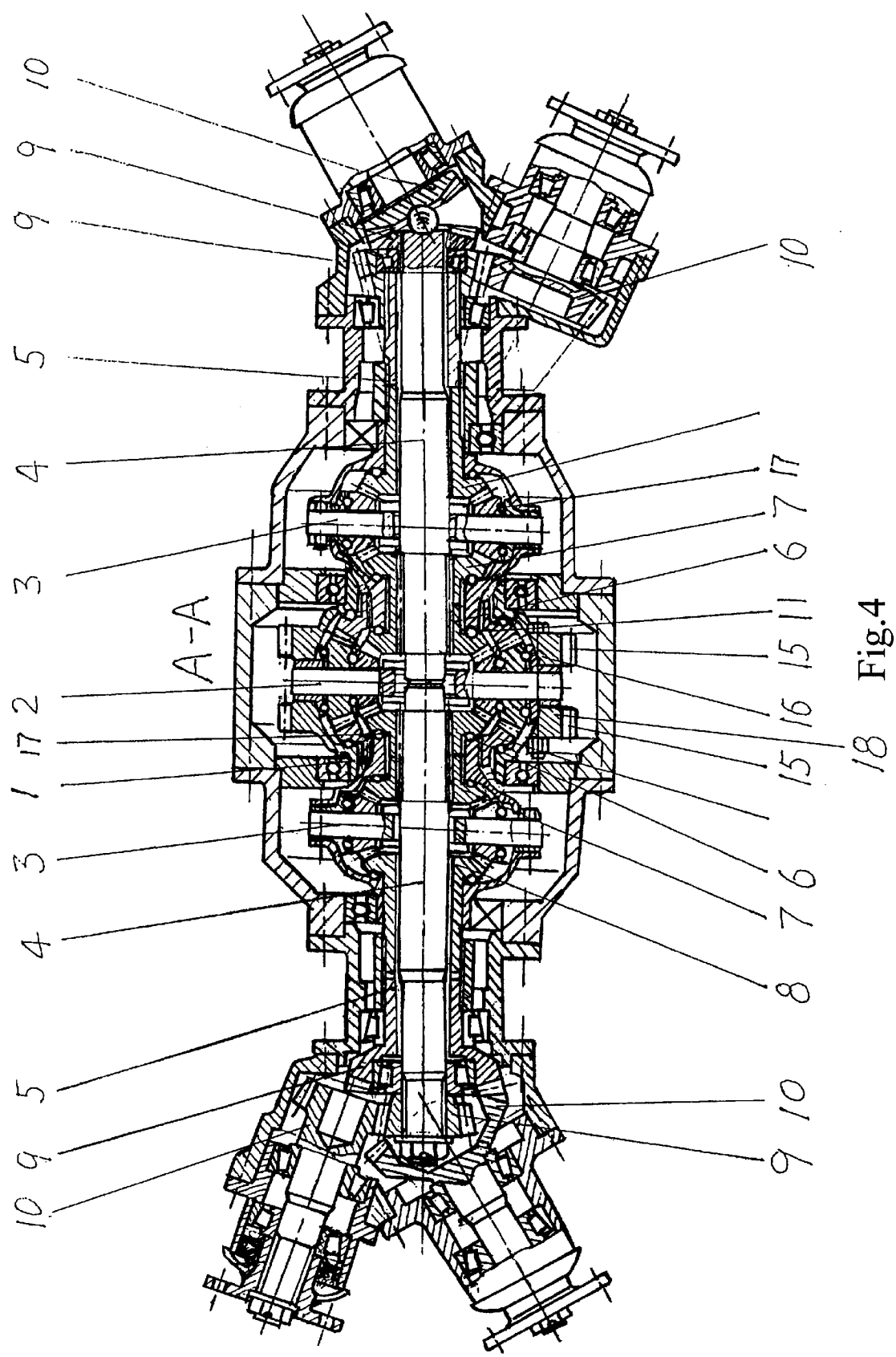
FIG. 4 is a sectional view taken along line A—A in FIG. 1, showing the torque output of the third embodiment of the present invention.

The sequence of the power distribution illustrated in FIG. 2 and FIG. 4 is that: the hollow axle shaft gears connected in series at the two side ends→the hollow axle shafts→the power distributing driving gears→the power distributing driven gears; the axle shaft gears of the inner central differential→the solid axle shaft gears connected in series at the two side ends→the solid axle shafts→the power distributing driving gears→the power distributing driven gears.

Figure 3:
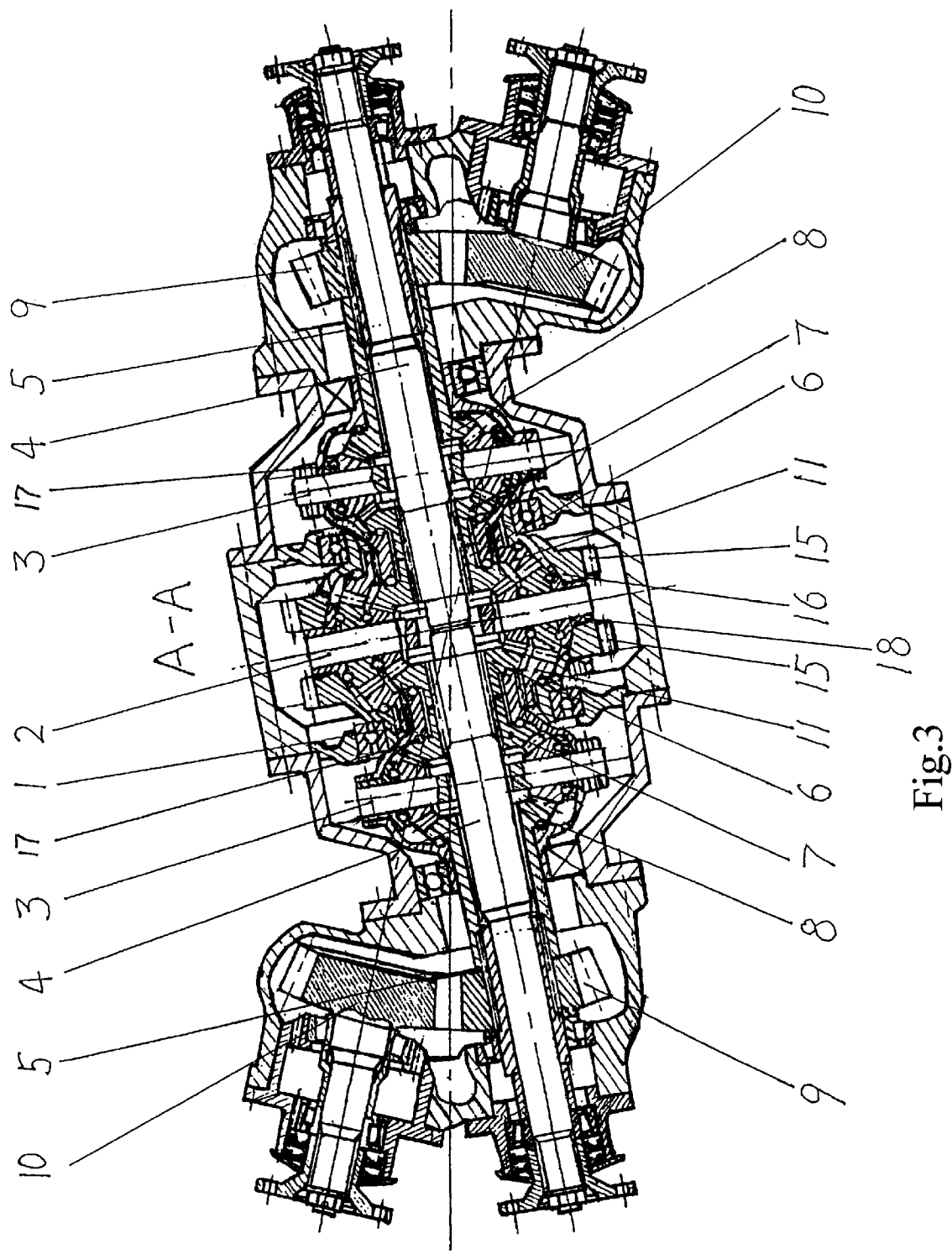
FIG. 3 is a sectional view taken along line A—A in FIG. 1, showing the torque output of the second embodiment of the present invention.

The sequence of the power distribution illustrated in FIG. 3 is that: the hollow axle shaft gears connected in series at the two side ends→the hollow axle shafts→the power distributing driving gears→the power distributing driven gears; the axle shaft gears of the inner central differential→the solid axle shaft gears connected in series at the two side ends→the solid axle shafts.

The normally interlocked universal differential device according to the present invention is mounted longitudinally on the central bottom portion of a vehicle, and can withdraw into the abdomen of the vehicle, thus smoothing the bottom of the vehicle, reducing the air resistance and lifting and enlarging the road clearance. Therefore, the vehicle has good steering ability and fuel economical efficiency. More particularly, since the slipping controller in the conventional differential device is eliminated, the structure of the differential device is more simplified and more advantageous, the volume thereof is reduced, thus optimizing the assembly and the steering ability of the vehicle. In addition, the friction balls are used for supporting, thus decreasing the friction and increasing the performance of the transmission.

The normally interlocked universal differential device according to the present invention can be applied to the all-wheel drive automobile, the tractor, the armored car, the wheeled engineering machinery and the wheeled engineering vehicle.

What is claimed is:
1. A normally interlocked universal differential device, comprising:

a central composite differential disposed in the central portion thereof and including an outer differential and an inner differential, said inner differential being fitted into said outer differential and using one pin in common to said outer differential;

two side differentials connected in series to both side ends of said central composite differential respectively, each of them having a solid axle shaft, a solid axle shaft gear mounted on said solid axle shaft, a hollow axle shaft and a hollow axle shaft gear mounted on said hollow axle shaft, the two solid axle shafts passing through corresponding said hollow axle shafts and said hollow axle shaft gears at one end thereof so that said two solid axle shafts are fitted into said two hollow axle shafts and led out from the outside ends of said two side differentials respectively, said two solid axle shafts being connected to each other at the other ends thereof via said two axle shaft gears of said inner central differential, said two hollow axle shafts of said two side differentials being coupled to the wheels located on one diagonal line, and said two solid axle shafts thereof being coupled to the wheels located on another diagonal line respectively, a planetary gear of said outer central differential being meshed with ring gears provided on the cases of said two side differentials; and two power distributors having power distributing driving gears and power distributing driven gears meshed with each other respectively, said two side differentials connected in series to both side ends of said central composite differential being coupled with wheels of a vehicle via said two power distributors respectively.

2. The normally interlocked universal differential device according to claim 1, wherein two axle shaft gears of said inner central differential are integrated with said two solid axle shaft gears of said two side differentials by said two solid axle shafts of said two side differentials passing through them, respectively.

3. The normally interlocked universal differential device according to claim 2, wherein said power distributing driving gears mounted on said solid axle shafts and said hollow axle shafts are meshed externally with said power distributing driven gears respectively, thus rotation direction of said power distributing driving gears is contrary to that of corresponding said power distributing driven gears respectively.

4. The normally interlocked universal differential device according to claim 2, wherein said power distributing driving gears mounted on said solid axle shafts are meshed externally with corresponding said power distributing driven gears respectively, thus rotation direction of said power distributing driving gears is contrary to that of corresponding said power distributing driven gears, and said power distributing driving gears mounted on said hollow axle shafts are so meshed with corresponding said power distributing driven gears that rotation direction of said power distributing driving gears is identical to that of corresponding said power distributing driven gears respectively.

5. The normally interlocked universal differential device according to claim 1, wherein said two axle shaft gears of the inner central differential are integrated with the adjacent axle shaft gears by said two solid axle shafts passing through them respectively, said two solid axle shafts are not coupled with said power distributing driving gears and transmit the torque to the wheels directly, and said two hollow axle shafts are coupled with said power distributing driving gears respectively.

6. The normally interlocked universal differential device according to claim 1, wherein between said inner central differential and said outer central differential, between said outer central differential and its case, and between said two side differentials and their respective case are provided with friction balls for supporting therein respectively.

* * * * *